US012798690B2

(12) United States Patent
Niezur et al.

(10) Patent No.: US 12,798,690 B2
(45) Date of Patent: Nov. 17, 2026

(54) DEVICE FOR REINFORCING A STRUCTURAL ELEMENT

(71) Applicant: SIKA TECHNOLOGY AG, Baar (CH)

(72) Inventors: Michael Niezur, Southfield, MI (US); Taylor Robertson, Oxford, MI (US)

(73) Assignee: SIKA TECHNOLOGY AG, Baar (CH)

( * ) Notice: Subject to any disclaimer, the term of this patent is extended or adjusted under 35 U.S.C. 154(b) by 160 days.

(21) Appl. No.: 18/875,865

(22) PCT Filed: Jul. 6, 2023

(86) PCT No.: PCT/EP2023/068728
§ 371 (c)(1),
(2) Date: Dec. 17, 2024

(87) PCT Pub. No.: WO2024/012984
PCT Pub. Date: Jan. 18, 2024

(65) Prior Publication Data

US 2026/0021851 A1 Jan. 22, 2026

(30) Foreign Application Priority Data

Jul. 14, 2022 (EP) .................................... 22185050

(51) Int. Cl.
*B62D 29/00* (2006.01)
*B62D 25/00* (2006.01)

(52) U.S. Cl.
CPC ........... *B62D 29/001* (2013.01); *B62D 25/00* (2013.01)

(58) Field of Classification Search
CPC ................................ B62D 29/01; B62D 25/00
USPC .................................................... 296/187.01
See application file for complete search history.

(56) References Cited

U.S. PATENT DOCUMENTS

2013/0133771 A1 5/2013 Richardson et al.

FOREIGN PATENT DOCUMENTS

EP 3 750 681 A1 12/2020
WO 03/020574 A1 3/2003

OTHER PUBLICATIONS

Sep. 26, 2023 International Search Report issued in International Patent Application No. PCT/EP2023/068728.
Dec. 18, 2024 International Preliminary Report on Patentability issued in International Patent Application No. PCT/EP2023/068728.

*Primary Examiner* — Steven O Douglas
(74) *Attorney, Agent, or Firm* — Oliff PLC

(57) ABSTRACT

Device for reinforcing a structural element in a motor vehicle, including: a first carrier which has an outer side with a mainly closed surface and an inner side with a surface defined mainly by ribs, wherein a first expandable material is arranged at least partially on the closed surface; a second carrier which has an outer side with a mainly closed surface and an inner side with a surface defined mainly by ribs, wherein a second expandable material is arranged at least partially on the closed surface; wherein the first and second carriers are connected together so the inner sides face one another; and wherein the outer sides are each directed towards a wall of the structural element in a state of use, so the first and the second expandable materials connect the carriers to walls of the structural element following expansion.

15 Claims, 3 Drawing Sheets

DEVICE FOR REINFORCING A STRUCTURAL ELEMENT

The invention relates to a device for reinforcing a structural element and to a system of a reinforced structural element in a motor vehicle.

Components, for example bodies and/or frames of transportation and conveyance means, in particular of aquatic or terrestrial vehicles or of aircraft, frequently have structures with cavities in order to make lightweight constructions possible. However, these cavities cause a wide variety of problems. Depending on the type of the cavity, the latter has to be sealed in order to prevent the ingress of moisture and dirt, which can lead to the corrosion of the components. It is often also desirable to substantially reinforce the cavities, and thus the component, but to retain the low weight. It is often also necessary to stabilize the cavities, and thus the components, in order to reduce noises which would otherwise be transmitted along or through the cavity. Many of these cavities have an irregular shape or tight dimensions, on account of which it becomes difficult to properly seal, reinforce, and damp said cavities.

In particular in automotive construction, but also in aircraft construction and boat building, sealing elements (baffles) are therefore used in order to seal and/or acoustically insulate cavities, or reinforcing elements (reinforcers) are used in order to reinforce cavities.

FIG. 1 schematically illustrates a body of an automobile. In this case, the vehicle body 10 has various structures with cavities, for example pillars 14 and carriers or braces 12. Such structural elements 12, 14 with cavities are usually sealed and/or reinforced, respectively, using sealing and/or reinforcing elements 16.

FIG. 2 schematically illustrates a known concept for sealing and/or reinforcing such structural elements having cavities in motor vehicles. In this case, FIG. 2 shows a reinforcing element 16 in a structural element 12, 14 prior to expansion of an expandable material 13. In this example, the expandable material 13 is arranged on surfaces of a carrier element 11 which are arranged in the vicinity of the structural element 12, 14. In this exemplary embodiment, the carrier element 11 has an M- or W-shaped cross section. A stiffness of the carrier element 11 is increased as a result.

This carrier element 11 or the reinforcing element 16 according to the prior art is formed with a cross section such that it can be produced easily by an injection-moulding process. To this end, adjacent faces of the carrier element 11 are formed with an angle 15 that is slightly greater than 90°. With such a configuration of the cross section of the carrier element 11, the injection-moulded carrier element 11 can easily be extracted from the mould of the injection-moulding machine.

A surface of the carrier element 11 which faces a respective inner side of the structural element 12, 14 typically has a chequerboard form. In this case, the connecting material or the expandable material 13 can be arranged in each case only on surfaces which are arranged in the vicinity of the structural element 12, 14.

A drawback of such reinforcing elements 16 is that the carrier element 11 cannot be connected optimally to the structural element 12, 14 because, for this purpose, not enough surfaces of the carrier element 11 are available that are located in the vicinity of the structural element 12, 14 and as a result are suitable for the attachment of connecting material 13.

The invention is therefore based on the object of providing an improved device of the type mentioned at the beginning, which allows the carrier to be connected to the structural element better. In addition, the device should be cost-effective and easy to produce.

This object is achieved by a device for reinforcing a structural element in a motor vehicle, comprising: a first carrier which has an outer side with a mainly closed surface and an inner side with a surface defined mainly by ribs, wherein a first expandable material is arranged at least partially on the closed surface of the outer side; a second carrier which has an outer side with a mainly closed surface and an inner side with a surface defined mainly by ribs, wherein a second expandable material is arranged at least partially on the closed surface of the outer side; wherein the first carrier and the second carrier are connected together such that the inner sides of the carriers face one another; and wherein the outer sides of the carriers are each directed towards a wall of the structural element in a state of use, such that the first expandable material and the second expandable material connect the carriers to walls of the structural element following expansion.

This solution has the advantage that, as a result, a significantly better connection of the carrier to the structural element can be achieved. The closed or substantially closed surface of the carrier element makes it possible to arrange adhesive extensively on both sides of the carrier and thus to connect the carrier to the structural element better. As a result, much better reinforcements of cavities can be achieved compared with devices according to the prior art.

A core concept of the invention is that, as a result of the provision of two carriers which are connected together, a new overall carrier can be provided, which provides a large attachment area for adhesive in order to connect this overall carrier to the structural element. In this case, the carriers can be put together as it were in a modular manner. As a result, such a device can be adapted ideally to the particular situation.

In one exemplary embodiment, the second expandable material of the second carrier is arranged in a peripheral region of the outer side such that the second expandable material connects the second carrier both to a wall of the structural element and to the inner side of the first carrier upon expansion.

This has the advantage that, as a result, a mechanically loadable connection is produced between the carriers after the second expandable material has expanded.

In an exemplary development, the second expandable material is arranged on at least 40%, in particular on at least 50%, in particular on at least 60%, in particular on at least 70%, in particular on at least 80% of the peripheral region of the outer side.

This has the advantage that, as a result, a larger area of the two carriers can be connected together, and/or that, as a result, a connection of the second carrier to the first carrier on different side surfaces can be achieved. Both result in mechanically loadable connections between the carriers.

In one exemplary embodiment, the second expandable material is arranged in the peripheral region of the outer side at a predefined distance from and substantially parallel to a rib of the first carrier, such that, upon expansion, an elongate connection is produced between the first and second carrier by the second expandable material.

This has the advantage that, as a result, a suitable attachment area of the first carrier can be used in order to achieve a connection between the carriers that is as mechanically loadable as possible.

In an exemplary development, the predefined distance is between 0.1 mm and 5 mm, in particular between 0.2 mm and 3 mm, in particular between 0.2 mm and 1 mm.

In one exemplary embodiment, the first carrier wall is larger than the second carrier.

In one exemplary embodiment, an area of the inner side of the second carrier amounts to between 10% and 80%, in particular between 20% and 70%, in particular between 30% and 60% of an area of the inner side of the first carrier.

In one exemplary embodiment, the outer side of the first carrier and/or of the second carrier has a closed surface to an extent of at least 70%, in particular to an extent of at least 75%, in particular to an extent of at least 80%.

This has the advantage that, as a result, a larger area for attaching to the structural element is available, such that better reinforcement can be achieved.

In one exemplary embodiment, the inner side of the first carrier and/or of the second carrier has a surface defined by ribs to an extent of at least 70%, in particular to an extent of at least 85%, in particular to an extent of at least 80%.

In one exemplary embodiment, the first carrier and the second carrier have been connected together by at least two mechanical connections, wherein each carrier comprises in each case two coupling elements which are mechanically connectable to the coupling elements of the respectively other carrier.

This has the advantage that, as a result, the prefixing of the carriers together can be achieved in a cost-effective and reliable manner.

In one exemplary embodiment, the coupling elements are in the form of clips and clip openings.

In one exemplary embodiment, the coupling elements are arranged on the second carrier in a peripheral region of the inner side, wherein the coupling elements are arranged on the first carrier on the inner side thereof.

In one exemplary embodiment, the mechanical connection fixes the first carrier and the second carrier together for assembly but does not connect the carriers mechanically together for an intended load case.

In one exemplary embodiment, the first expandable material and the second expandable material have the same composition.

In an alternative embodiment, the first expandable material and the second expandable material do not have the same composition, wherein the materials differ in particular by having a different expansion rate.

In one exemplary embodiment, the first expandable material and/or the second expandable material have an expansion rate of more than 100% and less than 800%, in particular more than 200% and less than 700%, in particular more than 250% and less than 600%.

In principle, different types of material can be used as the expandable material. For example, the following commercially available adhesives can be used: SikaReinforcer®-911, SikaReinforcer®-940, SikaReinforcer®-941, SikaReinforcer®-942, SikaReinforcer®-943, SikaReinforcer®-951 and SikaReinforcer®-955.

In one exemplary embodiment, the first expandable material and/or the second expandable material is curable by a temperature of more than 120°.

In one exemplary embodiment, the first carrier and/or the second carrier has been produced with the expandable material arranged respectively thereon by a two-component injection-moulding process.

This has the advantage that, as a result, cost-effective devices can be produced.

In one exemplary embodiment, the carrier contains plastic, fibre-reinforced plastic (in particular carbon-fibre-reinforced plastic or glass-fibre-reinforced plastic), or a combination of these materials.

The object set at the beginning is also achieved by a system of a reinforced structural element in a motor vehicle, wherein the system comprises: a structural element; a device as described above, wherein the device is arranged in the structural element; wherein the expanded material connects the carriers to the structural element and connects the carriers together.

Details and advantages of the invention will be described in the following text on the basis of exemplary embodiments and with reference to schematic drawings, in which.

Figure 1:
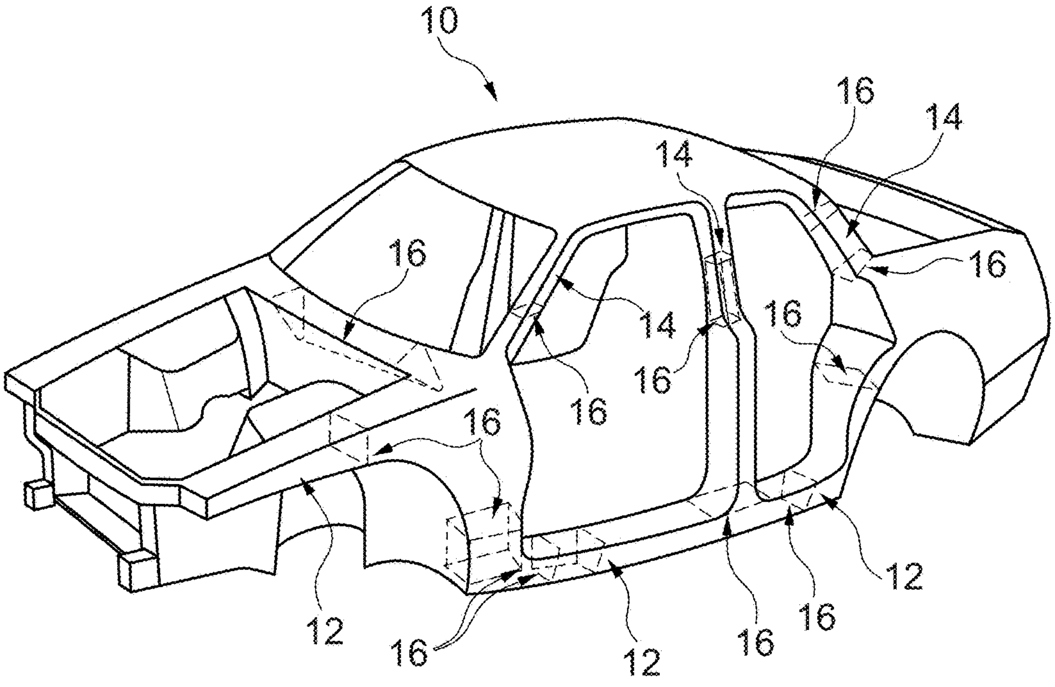
FIG. 1 shows an exemplary illustration of a vehicle body.
Figure 2:
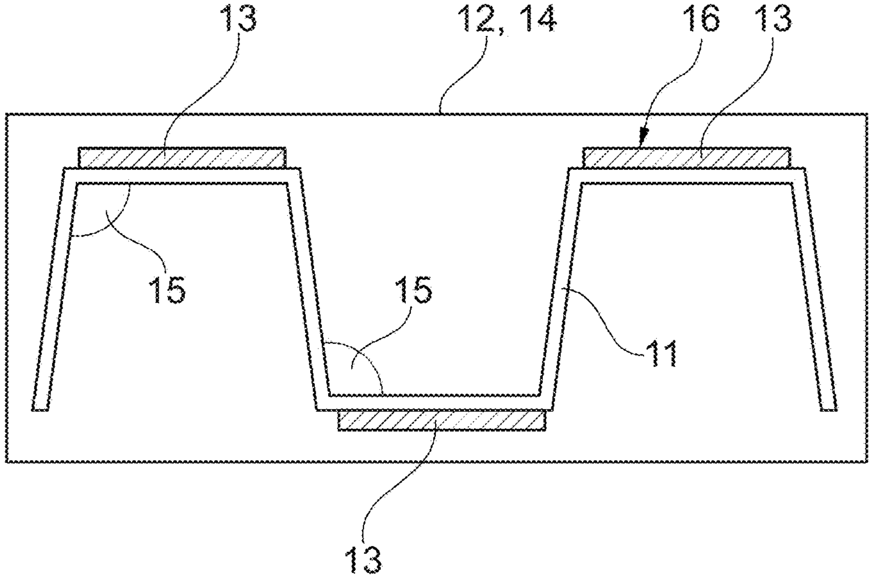
FIG. 2 shows a schematic illustration of an exemplary device according to the prior art.
Figure 3A:
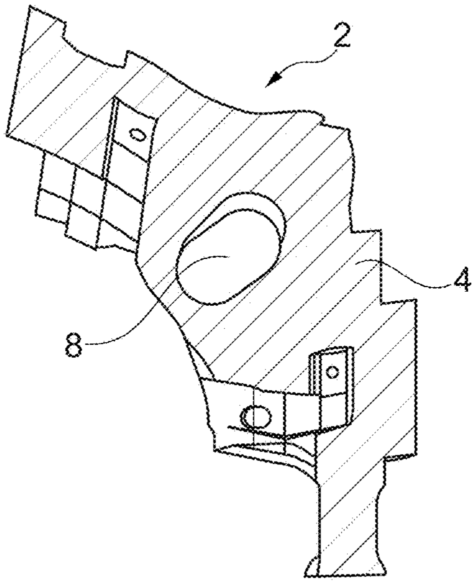
Figure 3B:
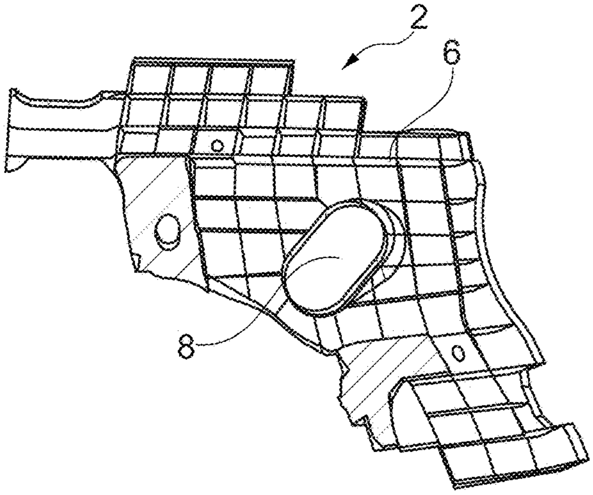
Figure 4A:
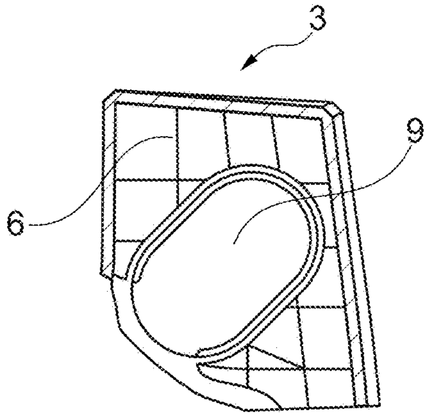
Figure 4B:
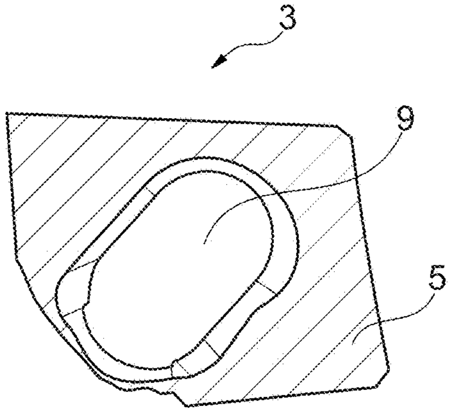
Figure 5:
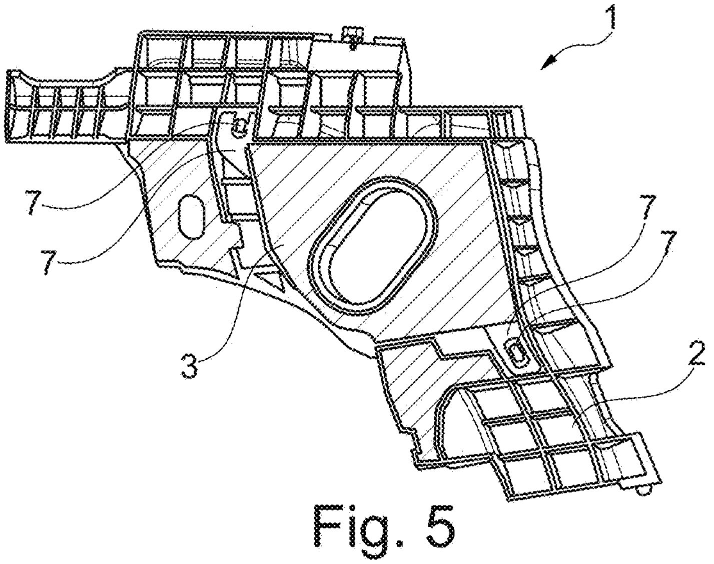

FIGS. 3*a* and 3*b* show schematic illustrations of an exemplary first carrier;

FIGS. 4*a* and 4*b* show schematic illustrations of an exemplary second carrier;

FIG. 5 shows a schematic illustration of an exemplary device; and

Figure 6A:
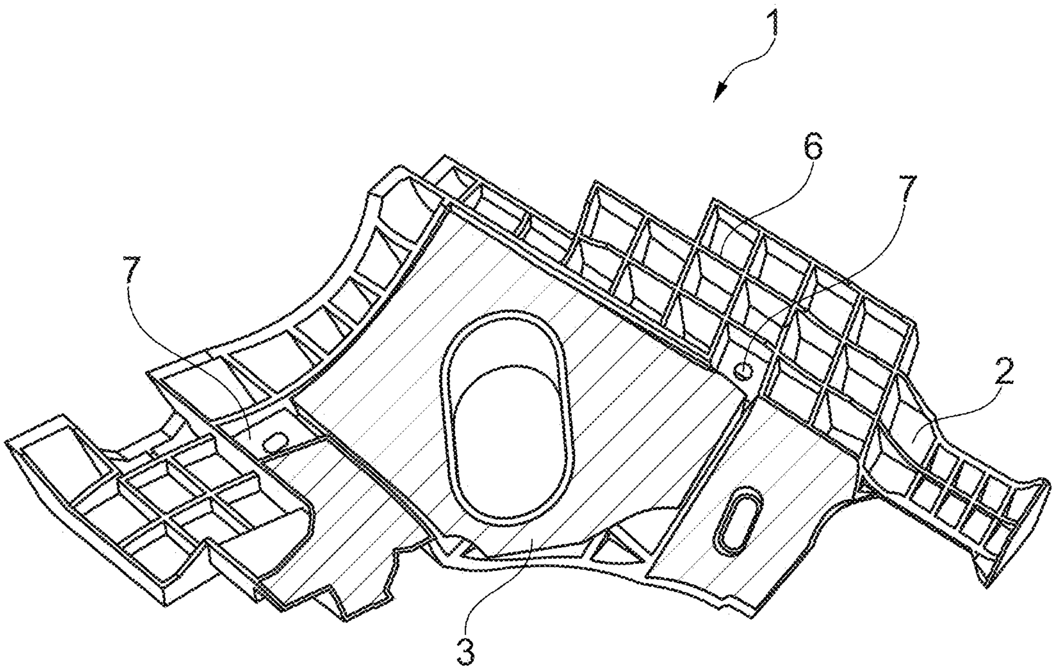
Figure 6B:
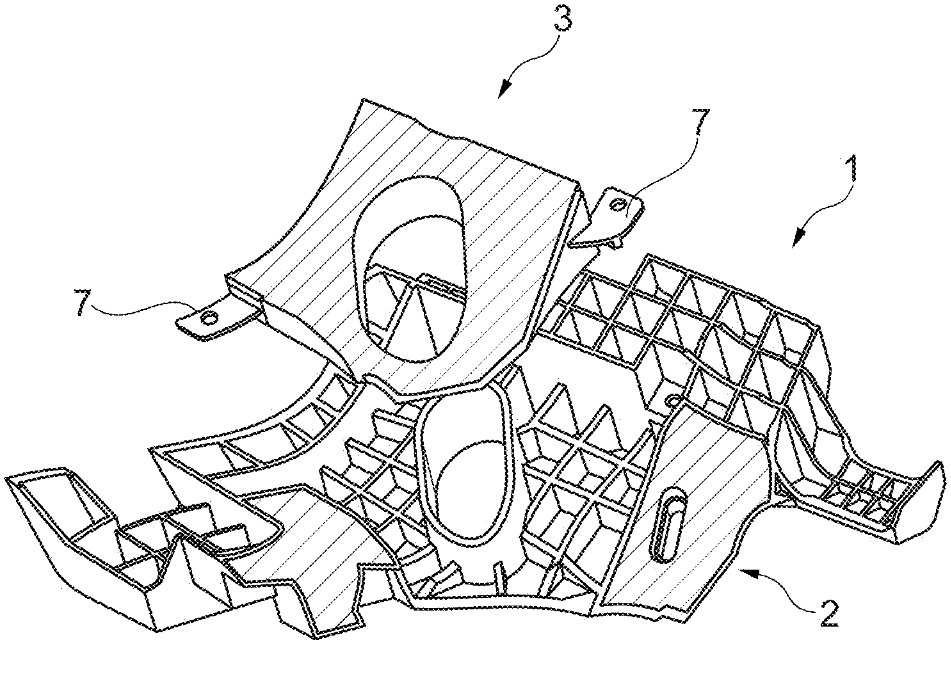

FIGS. 6*a* and 6*b* show schematic illustrations of an exemplary device.

FIGS. 3*a* and 3*b* illustrate an exemplary first carrier 2. In this case, FIG. 3*a* shows the outer side of the first carrier 2, which has a mainly closed surface, wherein a first expandable material 4 is arranged on this closed surface. FIG. 3*b* shows the inner side of the carrier 2, which has a surface defined mainly by ribs 6.

In this exemplary embodiment, the first carrier 2 has a first opening 8, which extends from the outer side to the inner side.

FIGS. 4*a* and 4*b* illustrate an exemplary second carrier 3. In this case, FIG. 4*a* shows the inner side of the second carrier 3, which has a surface defined mainly by ribs 6. FIG. 4*b* shows the outer side of the second carrier 3, which has a mainly closed surface, wherein a second expandable material 5 is arranged on this closed surface.

In this exemplary embodiment, the second carrier 2 has a second opening 9, which extends from the outer side to the inner side.

FIG. 5 illustrates an exemplary device 1, which comprises both the first carrier 2 and the second carrier 3. In this case, the carriers 2, 3 have been connected together such that the inner sides of the carriers 2, 3 face one another.

In this exemplary embodiment, the first carrier 2 and the second carrier 3 each have two coupling elements 7, which are each able to be mechanically connected to the coupling elements 7 of the other carrier 2, 3.

FIGS. 6*a* and 6*b* in turn illustrate an exemplary device 1. In this case, FIG. 6*b* shows a situation before the first carrier 2 and the second carrier 3 are connected, and FIG. 6*a* shows the device 1 with the carriers 2, 3 connected together. In this example, too, the carriers 2, 3 have been connected mechanically together in that coupling elements 7 engage respectively in corresponding coupling elements 7 of the other carrier 2, 3.

The openings 8, 9 in the carriers 2, 3 are in this case formed such that, in a connected state of the carriers 2, 3, they lie substantially one on top of another, such that the device 1 has an opening which passes both through the first carrier 2 and through the second carrier 3.

LIST OF REFERENCE SIGNS

1 Device
2 First carrier

3 Second carrier
4 First expandable material
5 Second expandable material
6 Rib
7 Coupling element
8 First opening
9 Second opening
10 Vehicle body
11 Carrier
12 Structural element
13 Adhesive
14 Structural element
15 Angle
16 Reinforcing element

The invention claimed is:

1. Device for reinforcing a structural element in a motor vehicle, comprising:

a first carrier which has an outer side with a mainly closed surface and an inner side with a surface defined mainly by ribs, wherein a first expandable material is arranged at least partially on the closed surface of the outer side;

a second carrier which has an outer side with a mainly closed surface and an inner side with a surface defined mainly by ribs, wherein a second expandable material is arranged at least partially on the closed surface of the outer side;

wherein the first carrier and the second carrier are connected together such that the inner sides of the carriers face one another; and wherein the outer sides of the carriers are each directed towards a wall of the structural element in a state of use, such that the first expandable material and the second expandable material connect the carriers to walls of the structural element following expansion.

2. Device according to claim 1, wherein the second expandable material of the second carrier is arranged in a peripheral region of the outer side such that the second expandable material connects the second carrier both to a wall of the structural element and to the inner side of the first carrier upon expansion.

3. Device according to claim 2, wherein the second expandable material is arranged in the peripheral region of the outer side at a predefined distance from and substantially parallel to a rib of the first carrier, such that, upon expansion, an elongate connection is produced between the first and second carrier by the second expandable material.

4. Device according to claim 3, wherein the predefined distance is between 0.1 mm and 5 mm.

5. Device according to claim 1, wherein the first carrier is larger than the second carrier.

6. Device according to claim 1, wherein an area of the inner side of the second carrier amounts to between 10% and 80% of an area of the inner side of the first carrier.

7. Device according to claim 1, wherein the outer side of the first carrier and/or of the second carrier has a closed surface to an extent of at least 70%.

8. Device according to claim 1, wherein the inner side of the first carrier and/or of the second carrier has a surface defined by ribs to an extent of at least 70%.

9. Device according to claim 1, wherein the first carrier and the second carrier have been connected together by at least two mechanical connections, and wherein each carrier comprises in each case two coupling elements which are mechanically connectable to the coupling elements of the respectively other carrier.

10. Device according to claim 9, wherein the coupling elements are in the form of clips and clip openings.

11. Device according to claim 9, wherein the coupling elements are arranged on the second carrier in a peripheral region of the inner side, and wherein the coupling elements are arranged on the first carrier on the inner side thereof.

12. Device according to claim 9, wherein the mechanical connection fixes the first carrier and the second carrier together for assembly but does not connect them mechanically together for an intended load case.

13. Device according to claim 1, wherein the first expandable material and the second expandable material have the same composition.

14. Device according to claim 1, wherein the first expandable material and/or the second expandable material have an expansion rate of more than 100% and less than 800%.

15. System of a reinforced structural element in a motor vehicle, the system comprising:

a structural element;

a device according to claim 1, wherein the device is arranged in the structural element;

wherein the expanded material connects the carriers to the structural element and connects the carriers together.

* * * * *